Nov. 2, 1943.  A. J. WEATHERHEAD, JR., ET AL  2,333,349

METHOD OF MAKING HOSE COUPLINGS

Filed Sept. 26, 1941

INVENTOR.
ALBERT J. WEATHERHEAD JR
BY HENRY D. STECHER
Bosworth & Sessions
ATTORNEYS.

Patented Nov. 2, 1943

2,333,349

UNITED STATES PATENT OFFICE 2,333,349

METHOD OF MAKING HOSE COUPLINGS

Albert J. Weatherhead, Jr., Shaker Heights, and Henry D. Stecher, Lakewood, Ohio, assignors to The Weatherhead Company, Cleveland, Ohio, a corporation of Ohio Application September 26, 1941, Serial No. 412,480

1 Claim. (Cl. 29—148.2)

This invention relates to hose couplings and methods of making the same, and more particularly to the method of making hose couplings which can be secured to the ends of non-metallic flexible hoses without requiring the use of any special tools or equipment, and which will make leakproof joints, adapted to withstand high pressures and severe operating conditions, with the hose ends.

Modern aircraft frequently embody devices actuated by fluid pressure, necessitating numerous flexible fluid lines, some of which carry liquids under high pressures, i. e., pressures greater than 1000 pounds per square inch. As the safety of the airplane may depend on the proper operation of these fluid actuated devices, such as retractible landing gears and power operated controls of various sorts, the fluid lines, including the couplings, must be absolutely reliable. Further, in order to facilitate installation and replacement of the flexible fluid lines, it is desirable that the couplings be constructed so that they may be applied to the hose ends without requiring any special tools or equipment so that the flexible hose can be cut to correct length and the hose ends applied thereto.

A general object of the present invention is to provide hose couplings which will meet the foregoing requirements and which can be economically manufactured. Another object is to provide an efficient and economical method of making such couplings. A further object is to provide such hose couplings which can be removed from the hoses to which they are secured, and used repeatedly without loss of efficiency, so that when a flexible hose has to be replaced the old couplings may be employed with the new hose. A further object is to provide a hose coupling which will not substantially restrict the flow of fluid in the hose. Another object is to provide couplings which are substantially foolproof in that they can be secured to hose ends in such manner as to produce correct joints without requiring any particular skill on the part of the workman performing the operation. Another object is to provide hose couplings embodying the advantages noted above and which are light in weight, compact, and economical of material.

Further objects and advantages of our invention will become apparent from the following description of a preferred form thereof, reference being made to the accompanying drawing. The essential features are summarized in the claim.

Figure 1:
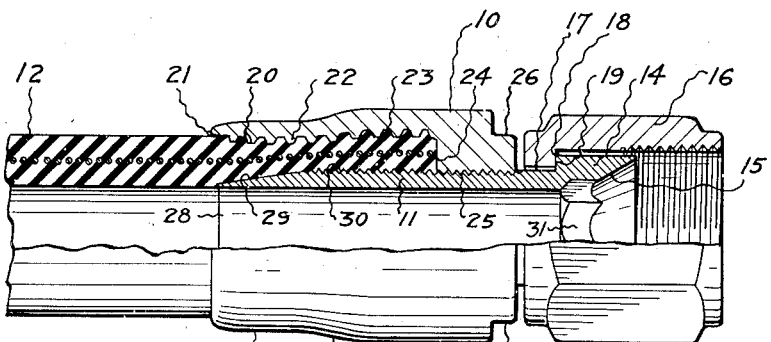
Figure 2:
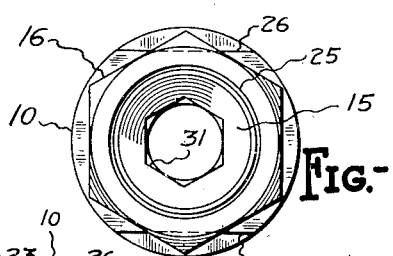
Figure 3:
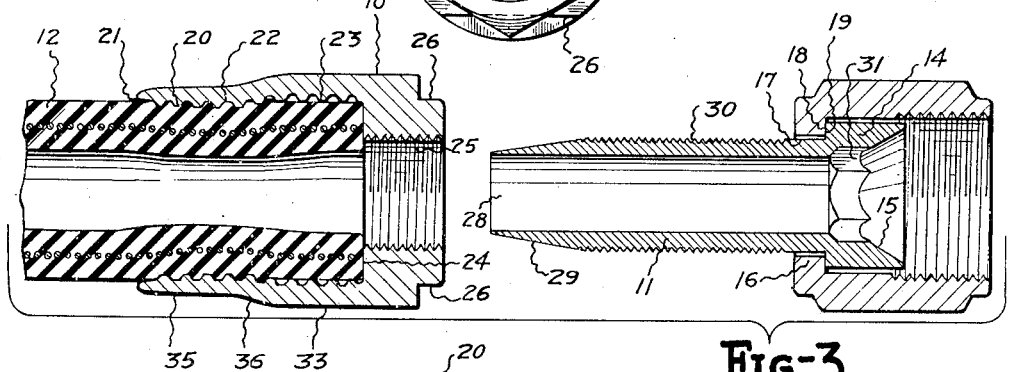
Figure 4:
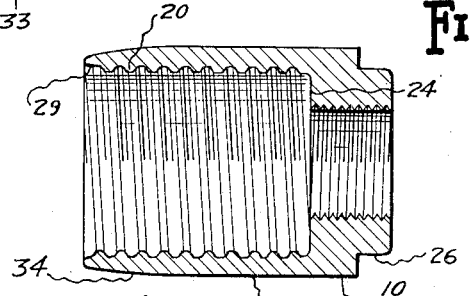

In the drawing, Fig. 1 is a side elevation, with parts broken away, showing a hose coupling made according to a preferred form of our invention, and showing the coupling secured to flexible hose; Fig. 2 is an end view of the coupling shown in Fig. 1; Fig. 3 is a longitudinal sectional view illustrating one stage in the operation of assembling hose and coupling; and Fig. 4 is a sectional view of the coupling body or sleeve illustrating an intermediate stage in the manufacture of our couplings.

As shown in Fig. 1 of the drawing a hose and coupling assembly embodying a preferred form of our invention may comprise an external sleeve or body member indicated generally at 10, and an internal nipple indicated generally at 11; these parts together form an annular chamber within which the end of the hose 12 is clamped. The hose may be of conventional construction, composed of rubber or synthetic rubber-like materials such as neoprene, thiokol or the like, and ordinarily provided with woven or braided reinforcements. The nipple is provided with a fluid connector, shown in this instance as an enlarged head 14 having a conical seat which is adapted to be held in engagement with another coupling member (not shown) by the coupling nut 16, which is swivelled on the cylindrical portion 17 of the nipple and held in position by engagement of the flange 18 with the shoulder 19. It is to be understood, however, that various other well known fluid connectors could be substituted for the arrangement just described and that our invention is not limited to this particular construction.

In order to clamp the hose securely between the sleeve or body 10 and the nipple 11, and to make a leakproof joint which will withstand high fluid pressures and have great mechanical strength, the sleeve is provided with a rather coarse internal thread 20, which, in the completed assembly, engages the hose with such pressure that the thread is imbedded in the material of the hose and the grooves are filled by the material of the hose as shown. The mouth portion 21 of the sleeve is chamfered so that its minimum internal diameter is substantially the same as the external diameter of sleeve, so that the hose may be readily inserted therein. The internal diameter of the sleeve then gradually becomes smaller so that the root diameter of the thread is substantially the same as the external diameter of the hose as at 22. Thus, the thread will indent the material of the hose for substantially the full depth of the thread at this zone. Thereafter, the diameter of the thread is gradually increased until the minimum diameter of the thread is substantially equal to the normal external diameter of the hose, as at 23, and the thread is continued at this diameter substantially to the radial end wall 24 against which the cut end of the hose abuts. The body 10 is provided with an internally threaded opening 25 to receive the nipple 11, the thread preferably being of opposite hand to the thread 20, and the body is also preferably provided with wrench engaging surfaces 26.

The nipple 11, which projects within the bore of the hose 12 so that the material of the hose is compressed between the external surface of the nipple and the internal surface of the sleeve, is provided with an axial bore 28 which is preferably of substantially the same diameter as the bore of the hose 12 so that flow of fluid through the hose will not be materially restricted by the coupling. The external surface of the nipple adjacent the end thereof is tapered as at 29 to facilitate entrance of the nipple into the bore of the hose. The nipple is threaded externally as at 30 from the tapered end 29 to the cylindrical portion 17, the threads engaging the threaded opening 25 as well as the bore of the hose.

The coupling is assembled with the hose by first screwing the hose end into the sleeve 10, producing the assembly shown in the left hand part of Fig. 3, with the cut end of the hose substantially in engagement with the radial end wall 25. It will be noted that this operation results in a slight reduction in the diameter of the bore of the hose opposite the portion 22 of the sleeve, but that the hose is not substantially reduced in diameter adjacent the cut end thereof, so that the nipple may be started into the hose with little difficulty. As the thread 20 is of lesser diameter than the normal outside diameter of the hose for only a portion of its length, the sleeve may be readily screwed onto the hose, the sleeve being held by the wrench engaging portions 26 during this operation.

After the sleeve has been screwed onto the hose, the tapered end of the nipple, with the nut positioned thereon as shown in the right hand portion of Fig. 3, is pushed into the end of the hose until the threaded portion 30 can be engaged with the threaded passageway 25 of the sleeve. Thereafter the nipple is screwed into the sleeve and the bore of the hose to produce the assembly illustrated in Fig. 1, broached wrench engaging surfaces 31 being provided for use in this operation. As the threads 30 and 20 are preferably of opposite hand—for example, thread 20 may be left hand while 30 is right hand—the operation of screwing the nipple into the hose will result in tightening the hose within the sleeve.

It will be noted that the hose is highly compressed between the nipple and the sleeve. The internal bore of the hose is expanded and tightly engages the external surface of the nipple with the thread 30 embedded in the material of the hose. The nipple expands the hose into tight engagement with the sleeve throughout substantially its entire length. The expansion is such that the material of the hose flows into and fills the grooves 22 even in the portion 23 where the root diameter of the threads is materially greater than the normal external diameter of the hose, and the pressure on the material of the hose is such that it is caused to flow endwise to firmly engage the radial end wall 24. The enlargement of the hose of the sleeve at 23, nearer the end of the hose than the restricted portion 22, gives a wedge shape to the hose end which securely keeps it within the coupling. This construction in conjunction with the threading of both sleeve and nipple for substantially their entire length contributes to the production of a joint which will withstand very great fluid pressures and have high mechanical strength, while the chamfered end of the sleeve and tapered end of the nipple not only facilitate the assembly of the coupling with the hose but also prevent damage to the hose by the coupling due to bending of the hose.

To provide a thread of varying diameter with an enlarged portion away from the mouth of the sleeve, as is the case with applicants' structure, would be difficult and expensive if not wholly impractical if ordinary machining methods were employed. However, sleeves with the desired form of thread can be produced rapidly and economically by our method. We preferably produce the sleeves 10 by first forming a sleeve as shown in Fig. 4 with the threads 20 of substantially uniform diameter throughout the length of the sleeve and extending as close to the radial end wall 24 as possible. Preferably the mouth of the sleeve is chamfered as at 29 as previously described. The exterior surface of the sleeve is preferably substantially cylindrical from the end thereof opposite the mouth of the sleeve to about the mid-portion of the sleeve as indicated at 33. The remainder of the exterior is tapered as shown at 34 adjacent the open end thereof. The sleeve as shown in Fig. 4 can be formed rapidly and economically by ordinary machining operations inasmuch as the thread is of substantially uniform depth throughout and the external contour of the sleeve can be produced readily.

In order to produce the finished sleeve shown in Figs. 1 and 3, the end of the sleeve of Fig. 4 is deformed inwardly, for example, by pushing the open end of the sleeve into a cylindrical die having a tapered opening, the amount of deformation depending upon the diameter of the die, the thickness of the sleeve and the contour of the exterior thereof. Thus, in the embodiment shown in the drawing, the mouth of the sleeve is subjected to substantially no deformation by the die, then the diameter of the sleeve is reduced as the die engages the tapered portion 34, giving the tapered portion 34 the external cylindrical shape shown at 35 in Figs. 1 and 3. The sleeve is inserted into the die to a point only about midway of the sleeve, the tapered mouth of the die producing the tapered portion 36 on the exterior of the sleeve and leaving the cylindrical portion 33 unchanged. By this simple operation of deforming the sleeve inwardly, the internal threads of varying depth are produced. Obviously other means may be employed for deforming the sleeve inwardly to give the desired contour to the threads, for example, the sleeve might be rolled or spun inwardly or deformed inwardly in a machine such as shown in the Hunziker Patent No. 2,211,622, issued August 13, 1940, the dies being shaped to give the threads the desired form.

From the foregoing it will be evident that we have provided a simple hose coupling which can be applied to the end of a hose without requiring any special tools or any particular skill on the part of the operator to produce a joint which will withstand great internal pressures and have high mechanical strength. These characteristics of the joint are due in large part to the fact that the sleeve is provided with a thread of varying internal diameter arranged so that the hose ends may be readily inserted within the sleeve and so that after the nipple is screwed into the hose end the material of the hose is expanded and compressed against the thread of the sleeve with the enlarged end portion of the hose providing a wedge or key to prevent the hose from being withdrawn from the coupling. Couplings made according to our invention are simple, require a minimum amount of material and can be produced rapidly and economically by our method.

Those skilled in the art will appreciate that various changes and modifications may be made in our invention without departing from the spirit or scope thereof. It is, therefore, to be understood that our patent is not limited to the embodiment disclosed herein or in any manner other than by the scope of the appended claim.

We claim:

In the art of coupling hoses, the steps of forming a hose engaging sleeve open at one end and having an integrally formed radial end wall and a substantially cylindrical interior surface, chamfering the interior of the open end thereof, threading said interior surface throughout substantially its entire length with a thread of substantially uniform diameter, then contracting the sleeve inwardly for a portion of its length remote from said radial end wall, thereby providing the sleeve with threads of reduced diameter spaced from said radial end wall, screwing a hose end into the sleeve substantially into engagement with said radial end wall, screwing a nipple through said end wall into the end of said hose and thereby expanding the hose to fill the sleeve in the zone of threads of larger diameter adjacent the radial end wall, and expanding the bore of the hose and simultaneously reducing the wall thickness thereof in the zone of threads of reduced diameter, and highly compressing the hose between the nipple and the sleeve throughout substantially the whole threaded length of the sleeve.

ALBERT J. WEATHERHEAD, Jr.
HENRY D. STECHER.